United States Patent
Shimizu et al.

(10) Patent No.: US 8,649,812 B2
(45) Date of Patent: Feb. 11, 2014

(54) MOBILE TERMINAL

(75) Inventors: Atsushi Shimizu, Yokohama (JP);
Tatsuaki Osafune, Kawasaki (JP)

(73) Assignee: Hitachi Automotive Systems, Ltd.,
Hitachinaka-shi (JP)

(*) Notice: Subject to any disclaimer, the term of this patent is extended or adjusted under 35 U.S.C. 154(b) by 280 days.

(21) Appl. No.: 13/123,150

(22) PCT Filed: Oct. 5, 2009

(86) PCT No.: PCT/JP2009/005158
§ 371 (c)(1),
(2), (4) Date: Jun. 30, 2011

(87) PCT Pub. No.: WO2010/041412
PCT Pub. Date: Apr. 15, 2010

(65) Prior Publication Data
US 2011/0250920 A1    Oct. 13, 2011

(30) Foreign Application Priority Data
Oct. 9, 2008 (JP) .................. 2008-262350

(51) Int. Cl.
*H04B 7/00* (2006.01)
(52) U.S. Cl.
USPC .............. 455/512; 455/76; 370/328; 370/338
(58) Field of Classification Search
USPC .............. 455/512, 76; 370/328, 338
See application file for complete search history.

(56) References Cited

U.S. PATENT DOCUMENTS

| | | | |
|---|---|---|---|
| 8,121,027 B2 * | 2/2012 | Watanabe et al. | 370/229 |
| 8,238,294 B2 * | 8/2012 | Lee et al. | 370/329 |
| 8,238,306 B2 * | 8/2012 | Yokota | 370/331 |
| 8,385,228 B2 * | 2/2013 | Shaffer et al. | 370/254 |
| 8,488,555 B2 * | 7/2013 | Nagatake et al. | 370/331 |
| 8,504,100 B2 * | 8/2013 | Songer et al. | 455/552.1 |
| 2003/0076791 A1 | 4/2003 | Sawabe et al. | |
| 2004/0192221 A1 * | 9/2004 | Matsunaga | 455/76 |
| 2012/0149298 A1 * | 6/2012 | Jiang et al. | 455/7 |

FOREIGN PATENT DOCUMENTS

| | | |
|---|---|---|
| CN | 1409521 A | 4/2003 |
| CN | 1996922 A | 7/2007 |
| JP | 10-327463 | 12/1998 |
| JP | 2004-304399 | 10/2004 |
| JP | 2005-198074 | 7/2005 |
| JP | 2006-324945 | 11/2006 |
| WO | WO 2007-063901 | 6/2007 |

OTHER PUBLICATIONS

PCT International Search Report on application No. PCT/JP2009/005158 mailed Dec. 8, 2009; 1 page.

* cited by examiner

*Primary Examiner* — Bobbak Safaipour
(74) *Attorney, Agent, or Firm* — Foley & Lardner LLP (57) ABSTRACT

A mobile terminal retains a communication device allocation priority table in which the allocation priorities of communication devices to respective applications are recorded for each of the communication devices mounted to the mobile terminal. The allocation priorities are determined from the combination of the types of an application and the operation state of the application. The mobile terminal allocates the communication devices to the applications in accordance with the priority orders recorded in the allocation priority table. The allocation priorities recorded in the communication device allocation priority table are varied in accordance with the operation states of the applications and the presence/absence of an alternate device.

6 Claims, 10 Drawing Sheets

| APPLICATION TYPE | CORRESPONDING WIRELESS COMMUNICATION DEVICE TYPE | UTILIZATION PRIORITY |
|---|---|---|
| HANDSFREE CALL | Bluetooth (HFP) | 1 |
| PHONE DIRECTORY DATA SYNCHRONIZATION | Bluetooth (PBAP) | 1 |
| | Wi-Fi | 2 |
| MUSIC STREAM REPRODUCTION | Bluetooth (A2DP) | 1 |
| | Wi-Fi | 2 |
| ... | ... | ... |

FIG. 5

| EVENTS FOR STARTING WIRELESS COMMUNICATION DEVICE ALLOCATION PROCESSING | |
|---|---|
| 1: CHANGE IN STATE OF EXTERNAL DEVICE | REQUEST FOR WIRELESS CONNECTION FROM DEVICE TO MOBILE TERMINAL: REQUEST FOR CONNECTION FROM CELLAR PHONE TO MOBILE TERMINAL UPON ARRIVAL OF CALL |
| | CELLAR PHONE: ARRIVAL OF CALL |
| 2: EXTERNAL DEVICE OPERATION BY USER | MUSIC PLAYER: DEPRESSION OF PLAY BUTTON |
| | CELLAR PHONE: DEPRESSION OF CALL BUTTON |
| 3: MOBILE TERMINAL ON-SCREEN OPERATION BY USER | ACTIVATION OF COMMUNICATION DEVICE APPLICATION |
| 4: MOVING OUT OF OR INTO WIRELESS COMMUNICATION AREA | COMMUNICATION VIA BASE STATION ENABLED/DISABLED |
| | CELLAR PHONE OR MUSIC PLAYER MOVED OUT OF OR INTO VEHICLE BY USER |
| 5: ALLOCATION OF COMMUNICATION DEVICE IN USE TO DIFFERENT APPLICATION (COMMUNICATION DEVICE ALLOCATION CHANGED) | |

FIG. 8

COMMUNICATION DEVICE SELECTION PRIORITY TABLE (VIDEO TRANSMISSION TO REAR-SEAT MONITOR) 97

| APPLICATION TYPE | CORRESPONDING WIRELESS COMMUNICATION DEVICE TYPE | UTILIZATION PRIORITY |
|---|---|---|
| VIDEO TRANSMISSION TO REAR-SEAT MONITOR | UWB | 1 |
| | Wi-Fi | 2 |

COMMUNICATION DEVICE ALLOCATION PRIORITY TABLE 98

| PRIORITY | APPLICATION TYPE | APPLICATION OPERATING STATE |
|---|---|---|
| 1 | PROXIMITY DETECTION | OPERATING |
| 2 | VIDEO TRANSMISSION TO REAR-SEAT MONITOR | REPRODUCING/TRANSMITTING |

COMMUNICATION DEVICE SELECTION PRIORITY TABLE (VIDEO TRANSMISSION TO REAR-SEAT MONITOR) 99

| PRIORITY | APPLICATION TYPE | APPLICATION OPERATING STATE |
|---|---|---|
| 1 | VIDEO TRANSMISSION TO REAR-SEAT MONITOR | REPRODUCING/TRANSMITTING |
| 2 | PROBE TRANSMISSION | UPLOADING/TRANSMITTING |
| 3 | VIDEO TRANSMISSION TO REAR-SEAT MONITOR | STOPPED/TRANSMISSION STOPPED |

COMMUNICATION DEVICE ALLOCATION PRIORITY TABLE (Bluetooth) -
WHEN NO ALTERNATIVE DEVICE (Wi-Fi) IS AVAILABLE ~123

| PRIORITY | APPLICATION TYPE | APPLICATION OPERATING STATE |
|---|---|---|
| 1 | MUSIC STREAM REPRODUCTION | DATA BEING TRANSFERRED |
| 2 | TELEPHONE DIRECTORY DATA TRANSFER | OPERATING |

COMMUNICATION DEVICE ALLOCATION PRIORITY TABLE (Bluetooth) -
WHEN ALTERNATIVE DEVICE (Wi-Fi) IS AVAILABLE ~125

| PRIORITY | APPLICATION TYPE | APPLICATION OPERATING STATE |
|---|---|---|
| 1 | TELEPHONE DIRECTORY DATA TRANSFER | DATA BEING TRANSFERRED |
| 2 | MUSIC STREAM REPRODUCTION | OPERATING |

MOBILE TERMINAL

FIELD OF THE INVENTION

The present information relates to a mobile terminal such as a car navigation system, and more particularly to a mobile terminal provided with plural communication devices and capable of appropriately allocating the communication devices.

BACKGROUND OF THE INVENTION

Patent Document 1 describes a communication terminal device which can use plural communication channels between itself and another communication terminal and which performs communication using communication identifiers for specifying communication channels. When a terminal application is activated, the communication terminal device communicates with the counterpart communication terminal using plural communication identifiers to collect information, such as response times and loss rates, representing communication quality of plural communication channels and determines, based on the collected information, a communication channel to be used.

Patent Document 1: Japanese Patent Laid-Open No. 2006-324945

SUMMARY OF THE INVENTION

In the patent document 1, a communication device allocation system is described which is aimed at enabling communication using an optimum communication channel selected, reflecting varying communication environments, for a specific application. The patent document 1, however, does not discuss allocation control for allocating plural communication devices to plural applications. According to the patent document 1, therefore, allocation control which can be performed without impeding the operations of active applications cannot be realized (problem 1), and allocation control which can effectively utilize an unused communication device cannot be realized, either (problem 2).

An object of the present invention is to provide communication device allocation control which can be performed without impeding the operations of active applications.

Another object of the present invention is to provide communication device allocation control which can effectively utilize an unused communication device.

According to the present invention, a mobile terminal mounted with plural communication devices holds a communication device allocation priority table corresponding to each of the plural communication devices. In the communication device allocation priority table, the priorities for allocating the corresponding communication device to different applications are recorded. The communication device allocation priorities are determined according to combinations of application types and the operating states of applications. The mobile terminal allocates the communication device to an application in accordance with the priorities recorded in the allocation priority table. The communication device allocation priorities recorded in the communication device allocation priority table are updated according to the operating states of applications and the availability of alternative communication devices.

According to the present invention, when determining the priorities for allocating a communication device to applications, the operating states of the applications can be taken into consideration so as to realize communication device allocation control which can be performed without impeding the operations of active applications.

Also, according to the present invention, to realize communication device allocation control which can effectively utilize an unused communication device, when there are plural communication devices which can be used to realize an application, that is, when an alternative communication device is available for an application, a low allocation priority is set for such an application. In this way, when competition for using a communication device occurs between plural applications, the alternative communication device can be allocated to an application which can use an alternative communication device.

According to the present invention, even when an event as cited below occurs, a mobile terminal, for example, a car navigation system mounted with plural wireless communication means such as Wi-Fi (registered trademark), WiMAX (registered trademark), UWB (registered trademark), and Bluetooth (registered trademark) devices does not impede the operations of applications which make use of communication devices and can effectively utilize communication devices not being used by applications. The event may be, for example, operation by the user of an external device, for example, a cellular phone or a music player, moving out of a wireless communication area, for example, by moving away from a wireless communication base station, or a change in a state of an external device, for example, arrival of a call at a cellular phone occurs.

Namely, the present invention can realize communication device allocation control which does not impede the operations of active applications.

Also, the present invention can realize communication device allocation control which can effectively utilize an unused communication device.

DETAILED DESCRIPTION OF THE EMBODIMENTS

The best mode of the present invention will be described below.

Hardware Configuration

Figure 1:
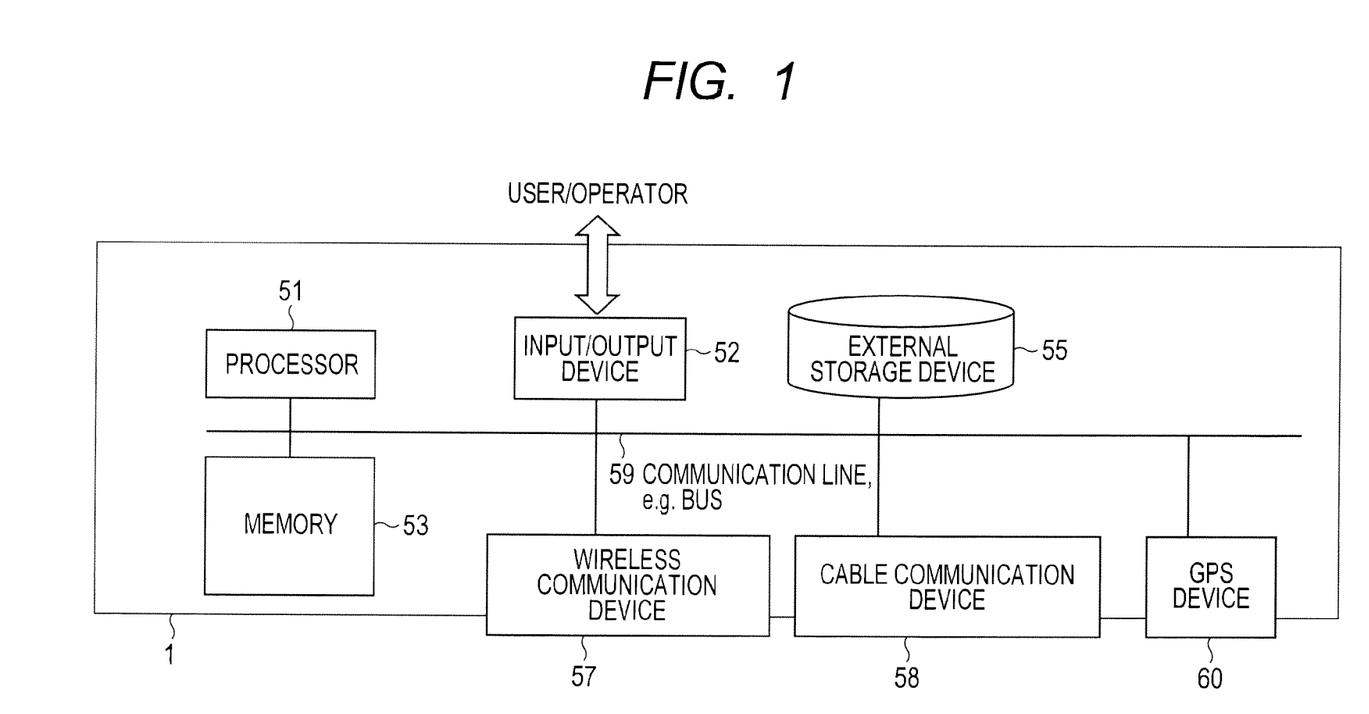
FIG. 1 is a schematic diagram showing a hardware configuration of a terminal according to the present mode of the invention.

FIG. 1 is a hardware configuration diagram of a mobile terminal.

The mobile terminal includes a CPU 51, a main memory 53, a nonvolatile storage device 55, a wireless communication device 57 for exchanging data with other terminals by wireless communication, an input/,output device 52 (e.g. a display, speaker, or touch panel) used to input/output data from/to, for example, a listener, viewer, or operator, and a GPS device 60 which are interconnected via a communication line 59, for example, a bus.

The CPU 51 performs various kinds of processing by reading programs stored in the storage device 55 into the main memory 53 and executing the programs. Such programs and data may be stored in the storage device 55 beforehand or inputted from a storage medium such as a CD-ROM or downloaded from another device via a network. The functions to be realized by the programs may alternatively be realized by specialized hardware.

Overall Configuration

Figure 2:
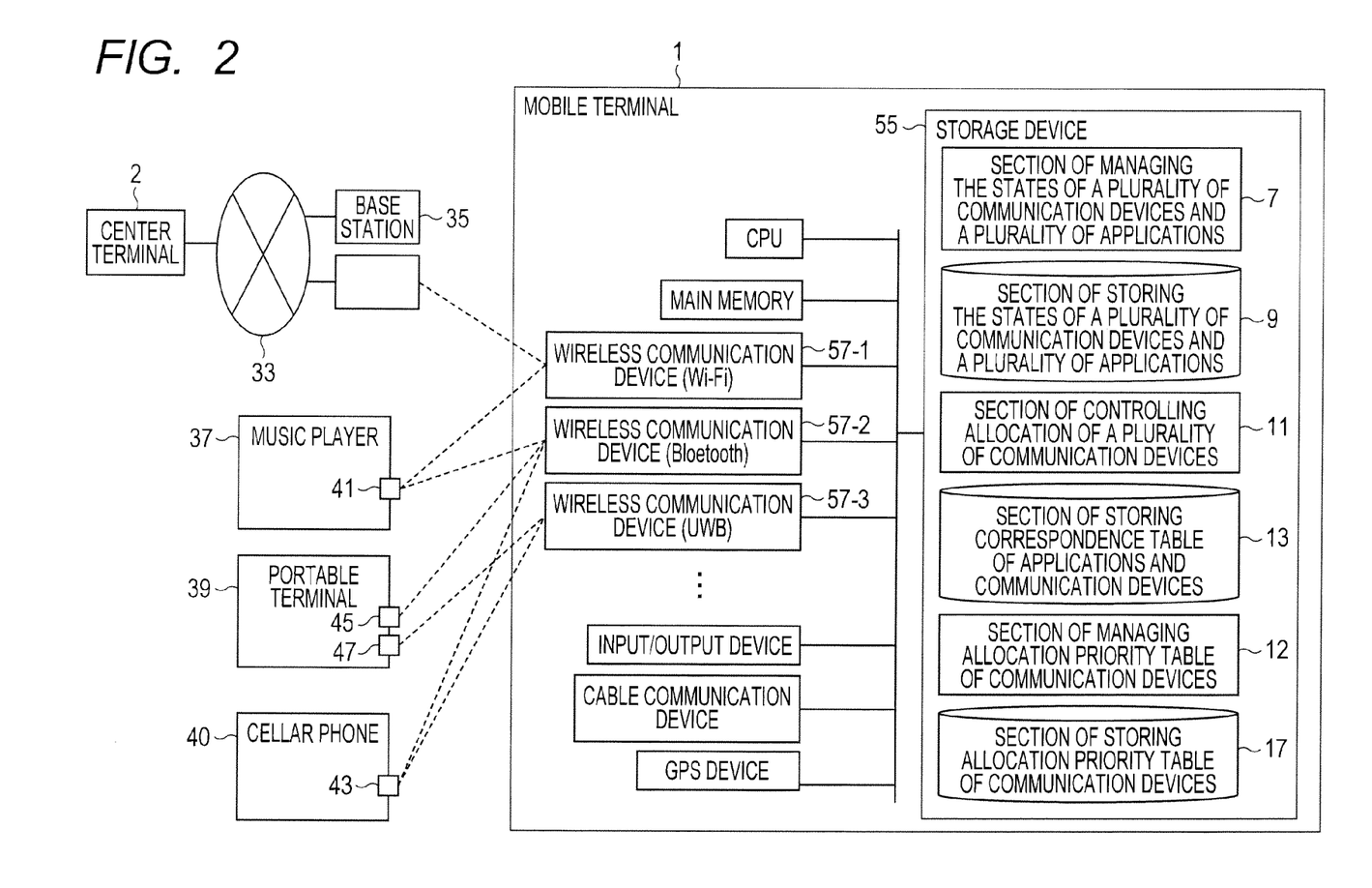
FIG. 2 is a schematic diagram showing a system configuration according to the present mode of the invention.

FIG. 2 shows an overall configuration according to the present mode.

The mobile terminal 1 is a terminal mounted on a mobile object such as a vehicle or carried by a pedestrian.

The mobile terminal 1 is provided with plural wireless communication devices 57-1, 57-2, and 57-3 which may include, for example, Wi-F, WiMAX, Bluetooth, or UWB devices. The mobile terminal 1 is connected by such wireless communication devices to, for example, a base station 35, a portable music player 37, a portable terminal 39 which may be a PDA, or a cellular phone 40. The base station (access point) 35 is a base station for Wi-Fi/WiMAX wireless communication based on IEEE802. The mobile terminal 1 can wirelessly communicate with the base station (access point) 35, so that it can connect, via the base station and a communication line 33 which may be Internet, to a management terminal.

The storage device 55 included in the mobile terminal 1 stores programs included in a section of managing the states of a plurality of communication devices and a plurality of applications 7, a section of controlling allocation of a plurality of communication devices 11, and a section of managing allocation priority table of communication devices 12, and data included in a section of storing the states of a plurality of communication devices and a plurality of applications 9, a section of storing correspondence table of applications and communication devices 13, and a section of storing allocation priority table of communication devices 17.

The section of managing a plurality of communication devices and a plurality of applications 7 collects, from the device drivers for the wireless communication devices 57-1, 57-2, and 57-3, information on the states of plural communication devices and applications, for example, information as to whether wireless connection processing has been completed/uncompleted or data communication is being performed and stores the collected information in the section of storing the states of a plurality of communication devices and a plurality of applications 9 in a table format (table of managing the states of a plurality of communication devices and a plurality of applications) including records indicating such states, communication device names and names of applications using the communication devices. The device drivers communicate with the corresponding devices via an I/O port and determines, based on the bit strings received from the devices, the states of the corresponding devices and applications. In the case of a Bluetooth communication device, for example, whether the device is in a state of having finished or not having finished Bluetooth profile connection processing or whether the device is engaged in data communication is determined and the determined state is stored in the section of storing a plurality of communication devices and a plurality of applications 9. The communication devices/applications management section 7 may set correspondence between Bluetooth profile types such as HFP (Hands Free Profile), DUN (Dial Up Network Profile), and OPP (Object Push Profile) and application types to manage such correspondence information together with the device/application states and use the information in determining the operating states of applications to be stored in the section of storing the stat of a plurality of communication devices and a plurality of applications 9.

Outline of System Operation

The operation of the mobile terminal 1 will be outlined below.

Figure 3:
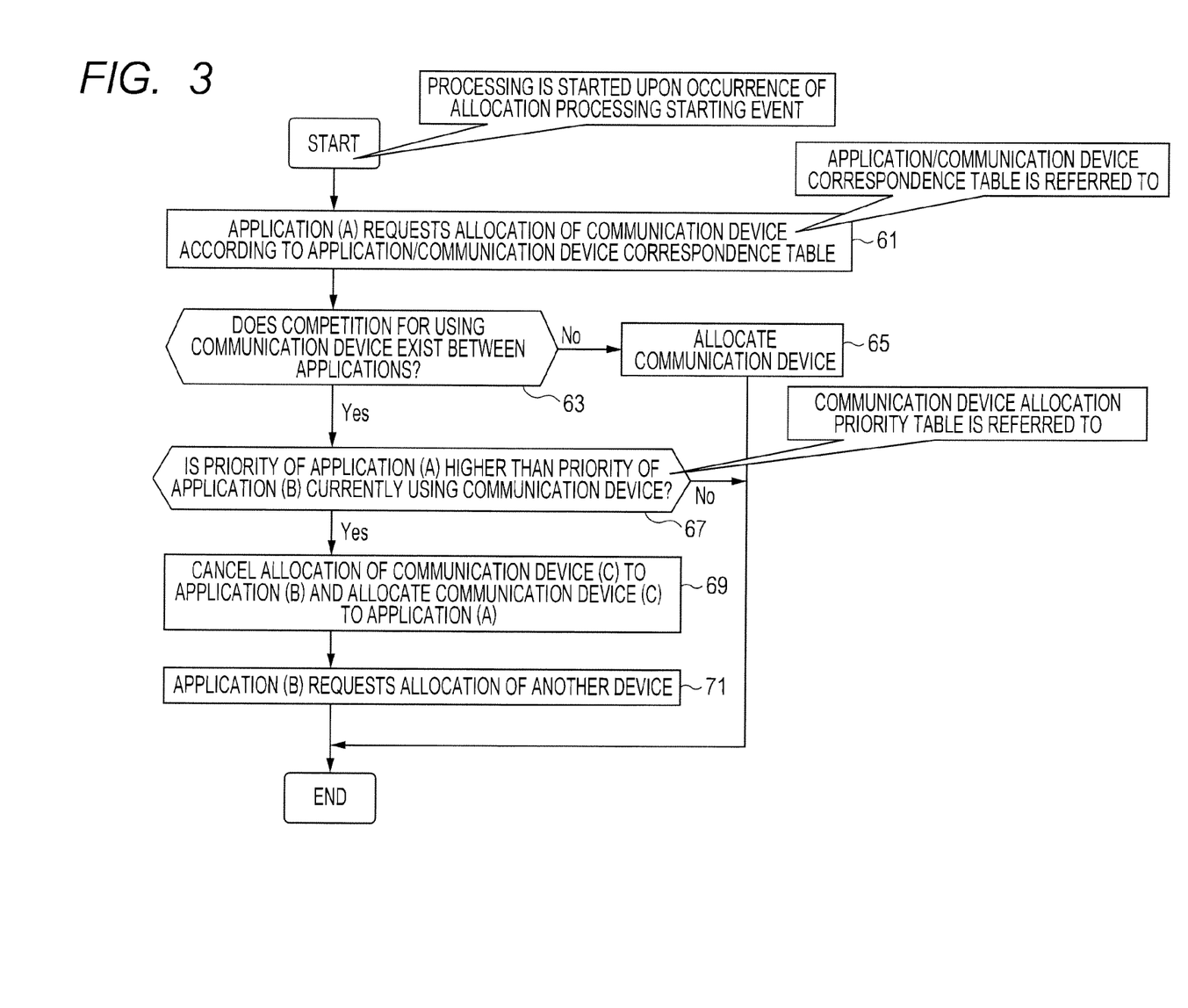
FIG. 3 is a flowchart of processing of a section of controlling allocation of a plurality of communication devices according to the present mode of the invention.
Figure 5:
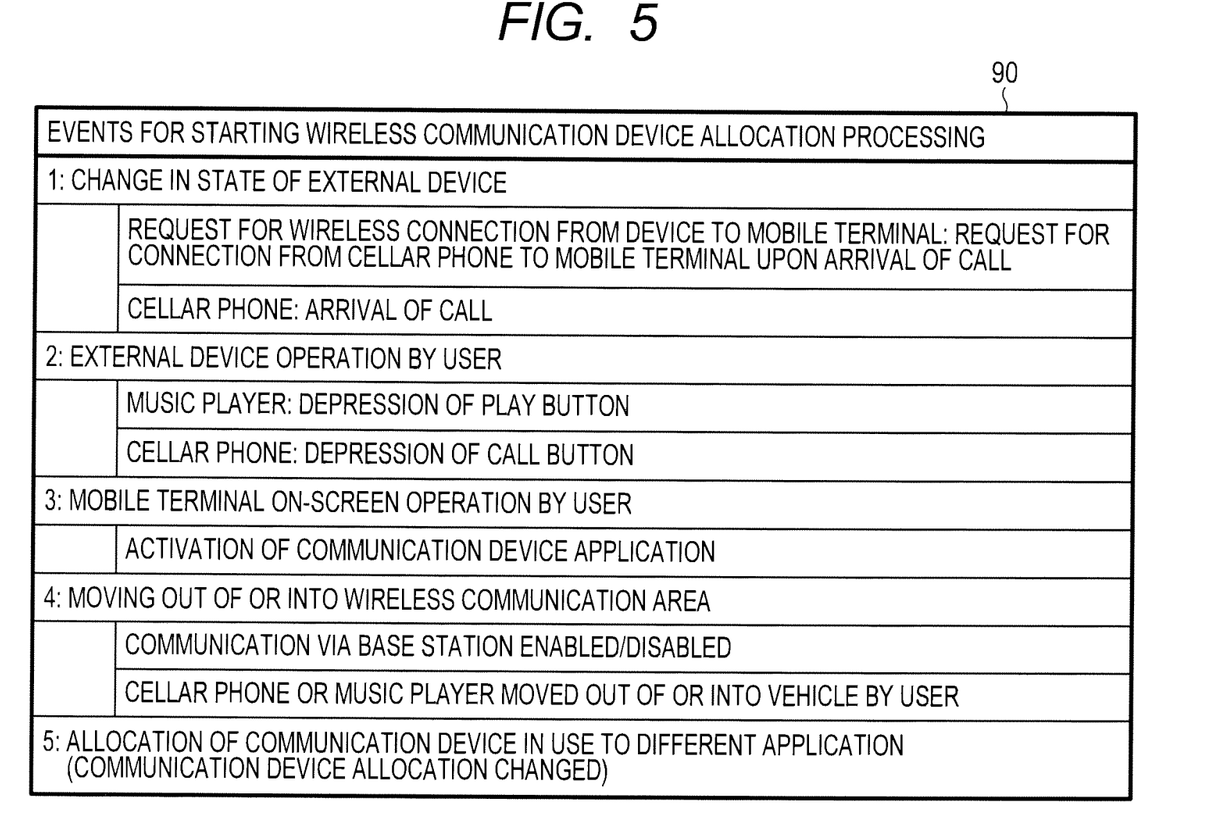
FIG. 5 is an explanatory diagram for allocation processing starting events according to the present mode of the invention.

When an event listed in a table 90 shown in FIG. 5 occurs, the mobile terminal 1 starts a flow of processing for controlling communication device allocation to plural applications to operate in the mobile terminal 1. FIG. 3 shows a basic processing flow performed, upon occurrence of an event, by the section of controlling allocation of a plurality of communication devices 11.

The following description is based on the assumption that applications (A) and (B) are operable in the mobile terminal 1 and that application (B) is currently using communication device (C).

Also assume that the applications (A) and (B) are for hands-free calling and music reproduction, respectively, and that the communication device (C) is a Bluetooth communication device.

The allocation control section 11 starts processing upon occurrence of an event listed in FIG.

When, for example, a call arrival event occurs at the application (A) (for hands-free calling), the application (A) issues a request for using a communication device to the allocation control section 11.

Figure 4:
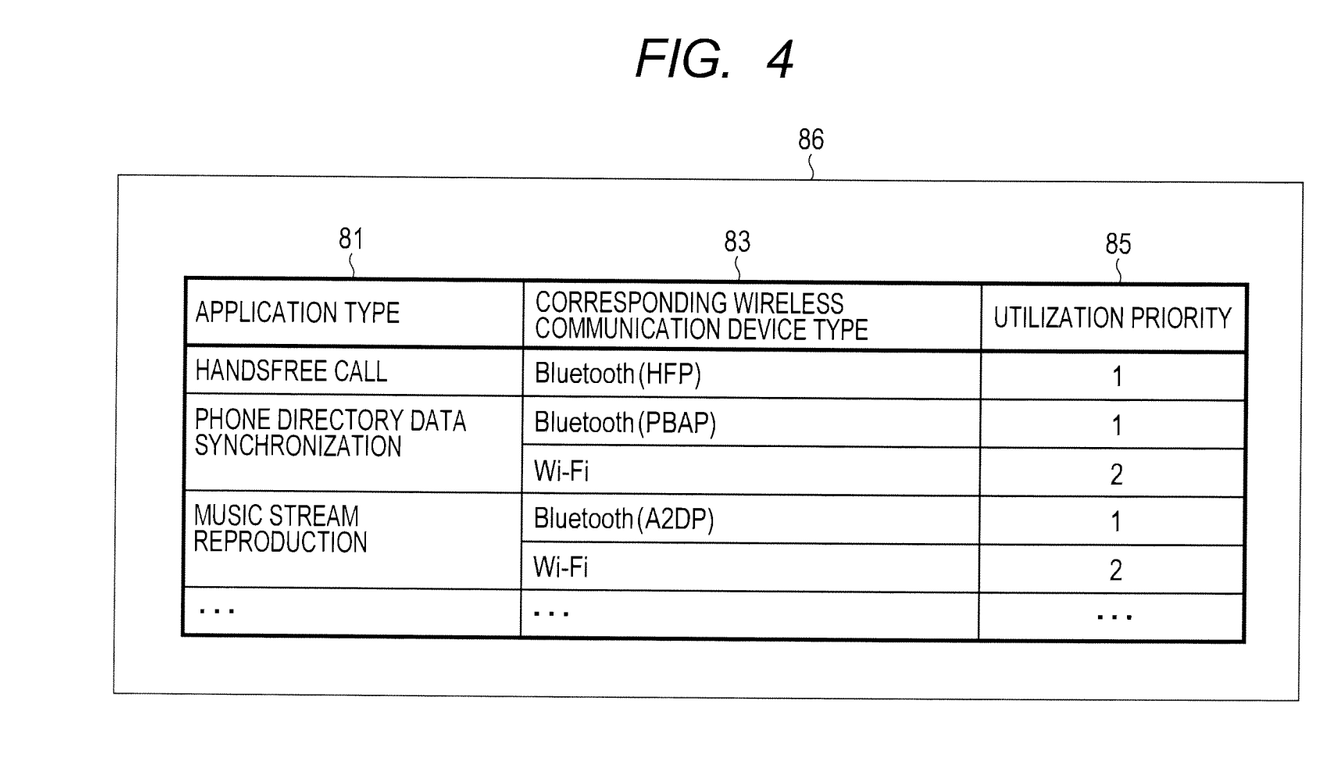
FIG. 4 is an explanatory diagram for an application/communication device correspondence table according to the present mode of the invention.

When a request for using a communication device is received from the application (A), the allocation control section 11 refers to a predefined application/communication device correspondence table 86 and selects a communication device whose utilization priority 85 is the highest among the communication devices compatible with the application (A). Namely, when there are plural communication devices compatible with an application, the allocation control section 11 selects a communication device to be allocated to the application according to their utilization priorities 85. When there is only one communication device compatible with an application, the communication device is selected regardless of its utilization priority 85. (61)

The allocation control section 11 refers to a table in which conditions for utilization competition occurrence are defined and also to the section of managing the states of a plurality of communication devices and a plurality of applications 7 to check the state of use by any application of the communication device (C) allocation of which is requested by the application (A). By doing so, the allocation control section 11 determines whether or not any condition for utilization competition occurrence is met, i.e. whether or not competition for using the communication device (C) occurs among plural applications (device cannot be used simultaneously by plural applications). (63)

When it is determined that no such utilization competition occurs, the allocation control section 11 allocates the communication device (C) to the application (A). (65)

Figure 6:
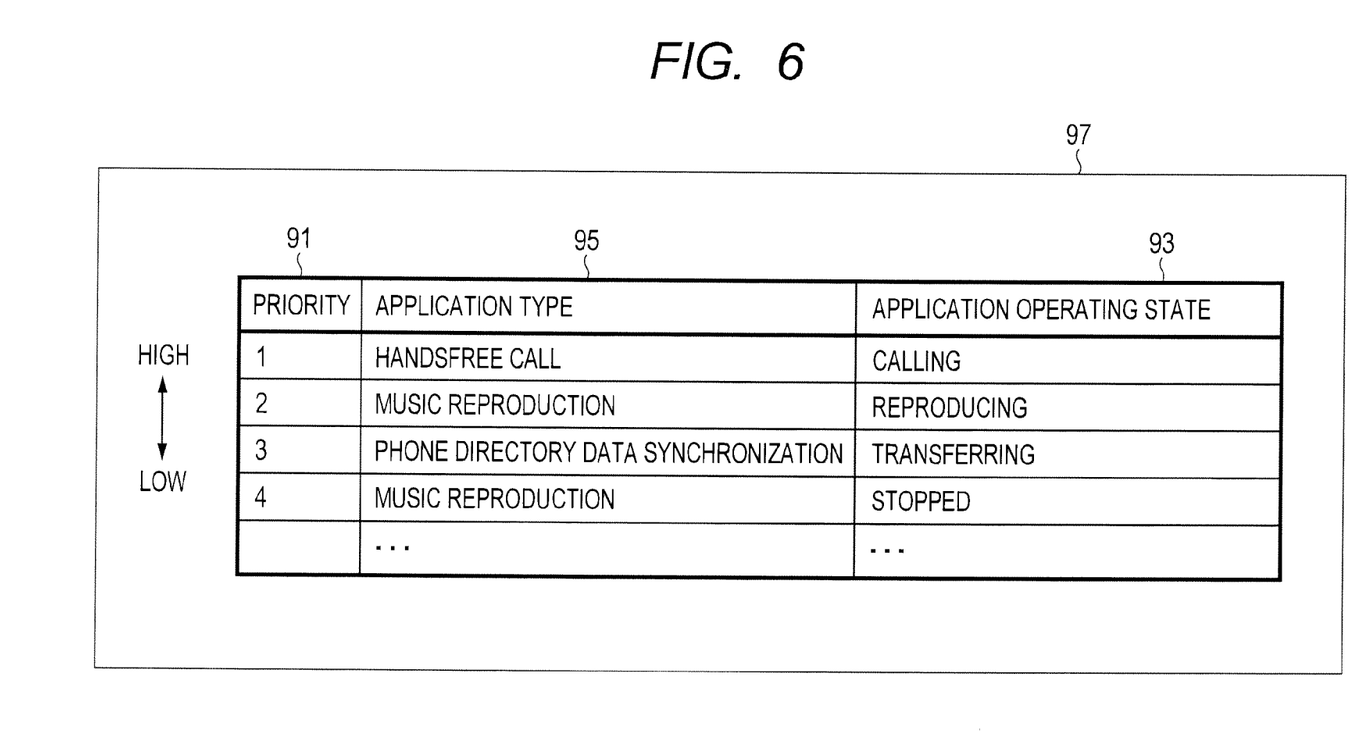
FIG. 6 is an explanatory diagram for a communication device allocation priority table according to the present mode of the invention.

When it is determined that utilization competition occurs, the allocation control section 11 refers to a communication device allocation priority table 97 corresponding to the communication device (C) and determines an application to which the communication device (C) is to be allocated according to the allocation priorities that are set based on application types and application operating states. (67)

When the allocation priority of the application (A) is higher than that of the application (B) currently using the communication device (C), the current allocation of the communication device (C) to the application (B) is canceled and the communication device (C) is allocated to the application (A). (69)

When the allocation priority of the application (A) is lower than that of the application (B) currently using the communication device (C), the application (A) requests for allocation of a communication device whose priority for the application (A) listed in the application/communication device correspondence table 86 is the second highest. (61 re-executed)

When the communication device (C) being used by the application (B) is allocated to another application, the application (B) requests the allocation control section 11 to allocate another communication device.

Application/Communication Device Correspondence Table

FIG. 4 shows an application/communication device correspondence table.

The application/communication device correspondence table lists application types 81 indicating type of applications which make use of communication, device types 83 of wireless communication devices which can be used to realize the application types, and their utilization priorities 85.

The utilization priorities 85 are referred to, when there are plural communication devices compatible with a single application, to determine a communication device to be allocated to the application.

According to FIG. 4, for example, the music stream reproduction application can use wireless communication devices, <1> Bluetooth A2DP profile and <2> Wi-Fi, with <1> higher in priority than <2>.

Communication Device Allocation Priority Table

FIG. 6 shows a communication device allocation priority table 97.

A communication device allocation priority table is defined for each wireless communication device (for each of 57-1, 57-2, and 57-3).

In the communication device allocation priority table 97, combinations of application types 95 and the operating states 93 of the corresponding applications are defined, and the defined combinations are assigned communication device allocation priorities 91. For example, the communication device allocation priority table shown in FIG. 6 concerns a Bluetooth communication device. <1> When the application operating state is "calling", the Bluetooth communication device is allocated, with priority 1, to the hands-free calling application. <2> When the application operating state is "reproducing", the Bluetooth communication device is allocated, with priority 2, to the music reproducing application. When communication device utilization competition occurs, <1> takes priority over <2>.

First Embodiment

Figure 7:
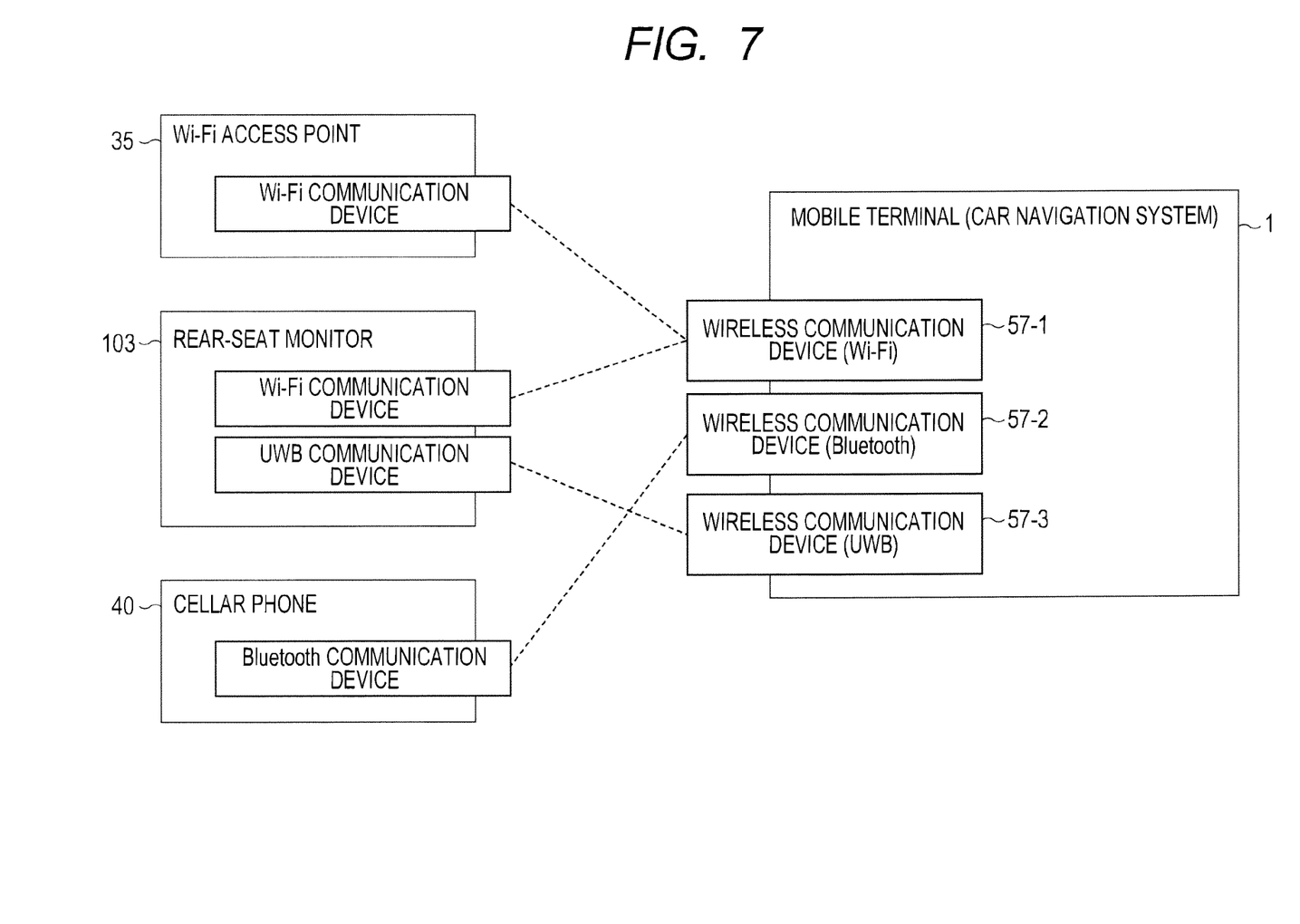
FIG. 7 is an explanatory diagram for a first embodiment of the present mode of the invention.

An embodiment of the present invention will be described below with reference to FIG. 7.

A mobile terminal 1 includes a Wi-Fi communication device, a UWB communication device, and a Bluetooth communication device.

The mobile terminal 1 is provided with a rear-seat video reproduction application for transmitting video to a rear-seat monitor 103 by Wi-Fi or UWB communication, a proximity detection application using a UWB communication function, and a probe application for transmitting vehicle information to a center terminal via a data communication network formed by coupling, using a Bluetooth communication function, with a cellular phone or formed, via a Wi-Fi base station, using a Wi-Fi communication function.

In a case where video is being transmitted to the rear-seat monitor by the rear-seat video reproduction application using the UWB communication function and a probe is being uploaded to the center by the probe application using the Wi-Fi communication function in infrastructure mode, when it becomes necessary to activate the proximity detection application that uses the UWB communication function to assist parking of a vehicle in which the mobile terminal is mounted and which is being moved to a parking space (occurrence of an event corresponding to item 5 in the table shown in FIG. 5), competition for using the UWB communication function occurs.

Figure 8:
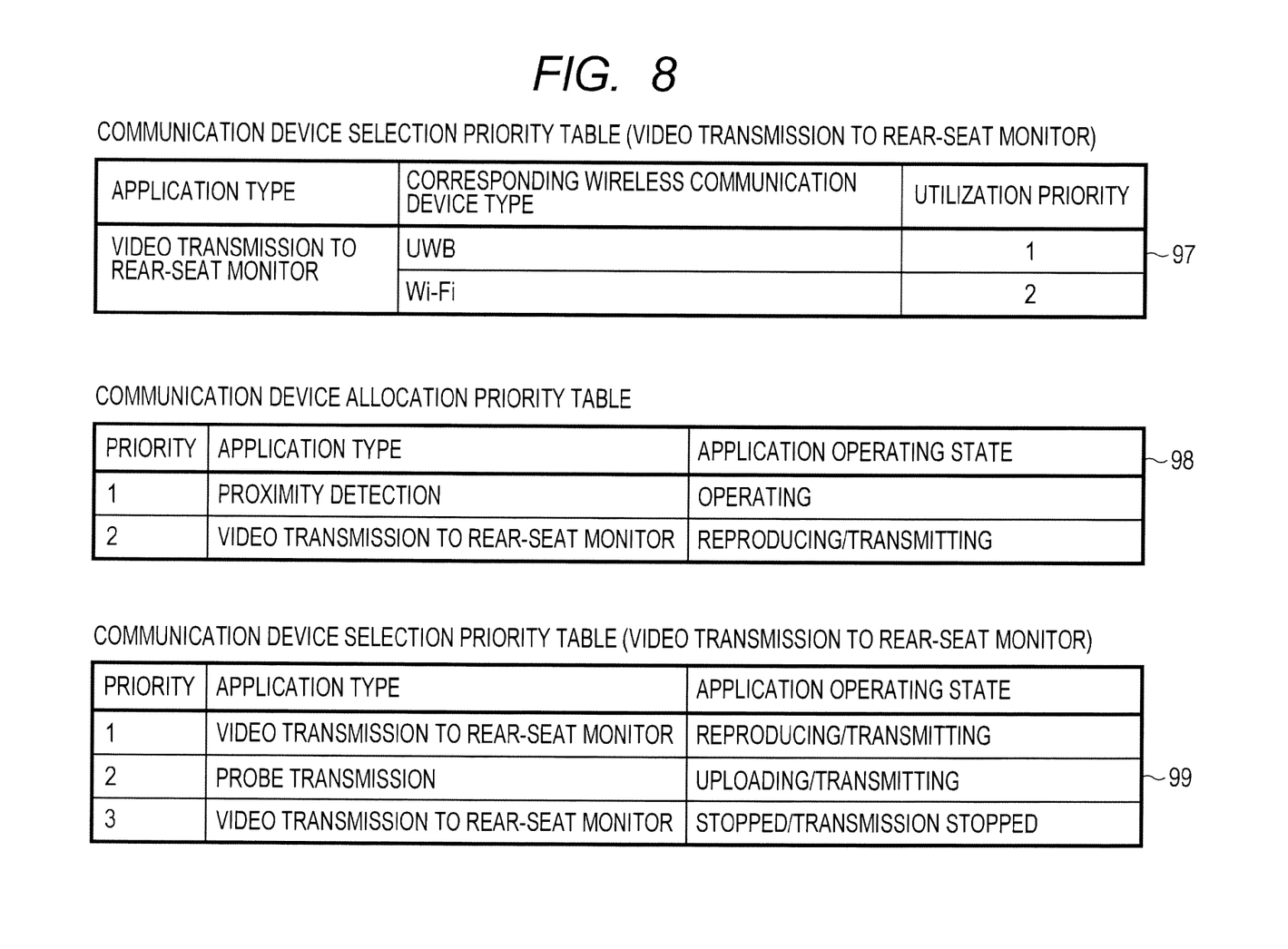
FIG. 8 is an explanatory diagram for the first embodiment of the present mode of the invention.

In this case, communication device allocation control is performed based on the communication device allocation priority table shown in FIG. 8 and the control flowchart shown in FIG. 3. The control flow will be concretely described below.

<Step 1>
(START in control flow shown in FIG. 3)

In a case where, as described above, competition for using the UWB communication function occurs (61 to 63 in FIG. 3), the section of controlling allocation of a plurality of communication devices 11 refers to the communication device allocation priority table (UWB) 98 and, in accordance with the priorities listed in the table, allocates the right to use the UWB communication function being used by the rear-seat video reproduction application to the proximity detection application (67 to 69 in FIG. 3). (END in control flow shown in FIG. 3)

<Step 2>
(START in control flow shown in FIG. 3)

Next, the allocation control section 11 selects, based on the application/communication device correspondence table, a communication device which can be allocated to the rear-seat video reproduction application that has lost the right to use the UWB communication function. (61 in FIG. 3)

The allocation control section 11 selects the Wi-Fi communication device as a candidate for allocation to the rear-seat video reproduction application and determines whether competition for using the Wi-Fi communication device occurs. The allocation control section 11 determines, because the infrastructure mode to be used by the probe application and the ad-hoc mode to be used by the rear-seat video reproduction application can be set only mutually exclusively, that competition for using the Wi-Fi communication device occurs. (63 in FIG. 3)

The allocation control section 11 refers to the operating state of the rear-seat video reproduction state indicated in the table of managing the states of a plurality of communication devices and a plurality of applications. Because competition for using the Wi-Fi communication device occurs, the allocation control section 11 refers to the communication device allocation priority table (Wi-Fi) and determines whether the Wi-Fi communication device can be allocated to the rear-seat video reproduction application. (67 in FIG. 3)

When the state of operation of the rear-seat monitor video transmission application is reproducing/transmitting, the allocation control section 11 allocates the right to use the Wi-Fi communication function to the rear-seat monitor video transmission application.

When the state of operation of the rear-seat monitor video transmission application is stopped/transmission stopped, the allocation control section 11 allocates the right to use the Wi-Fi communication function not to the rear-seat monitor video transmission application but to the probe application.

As described above, the present invention enables communication device re-allocation control without impeding operation of the rear-seat monitor video transmission application. (END in control flow shown in FIG. 3)

Second Embodiment

Figure 9:
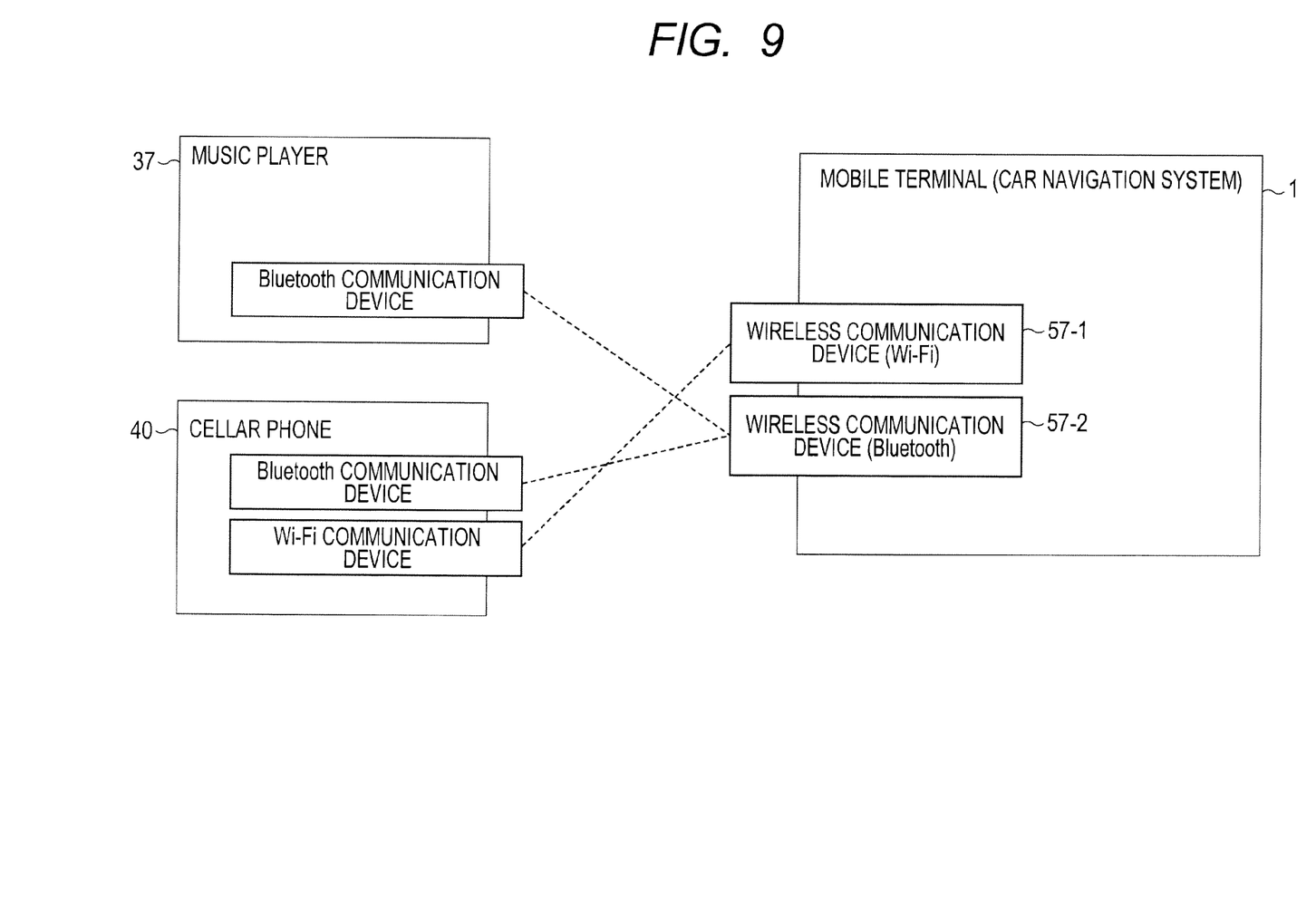
FIG. 9 is an explanatory diagram for a second embodiment of the present mode of the invention.

An embodiment of the present invention will be described with reference to FIG. 9.

A mobile terminal 1 includes a Wi-Fi communication device and a Bluetooth communication device.

A music player 37 is provided with a Bluetooth communication device, and a cellular phone 40 is provided with a Bluetooth communication device and a Wi-Fi communication device.

The mobile terminal 1 is provided with a music stream reproduction application for reproducing a music stream transmitted from the music player 37 using a Bluetooth communication function and a phone directory data transfer application for transferring phone directory data from the cellular phone 40 using a Bluetooth or Wi-Fi communication function.

Figure 10:
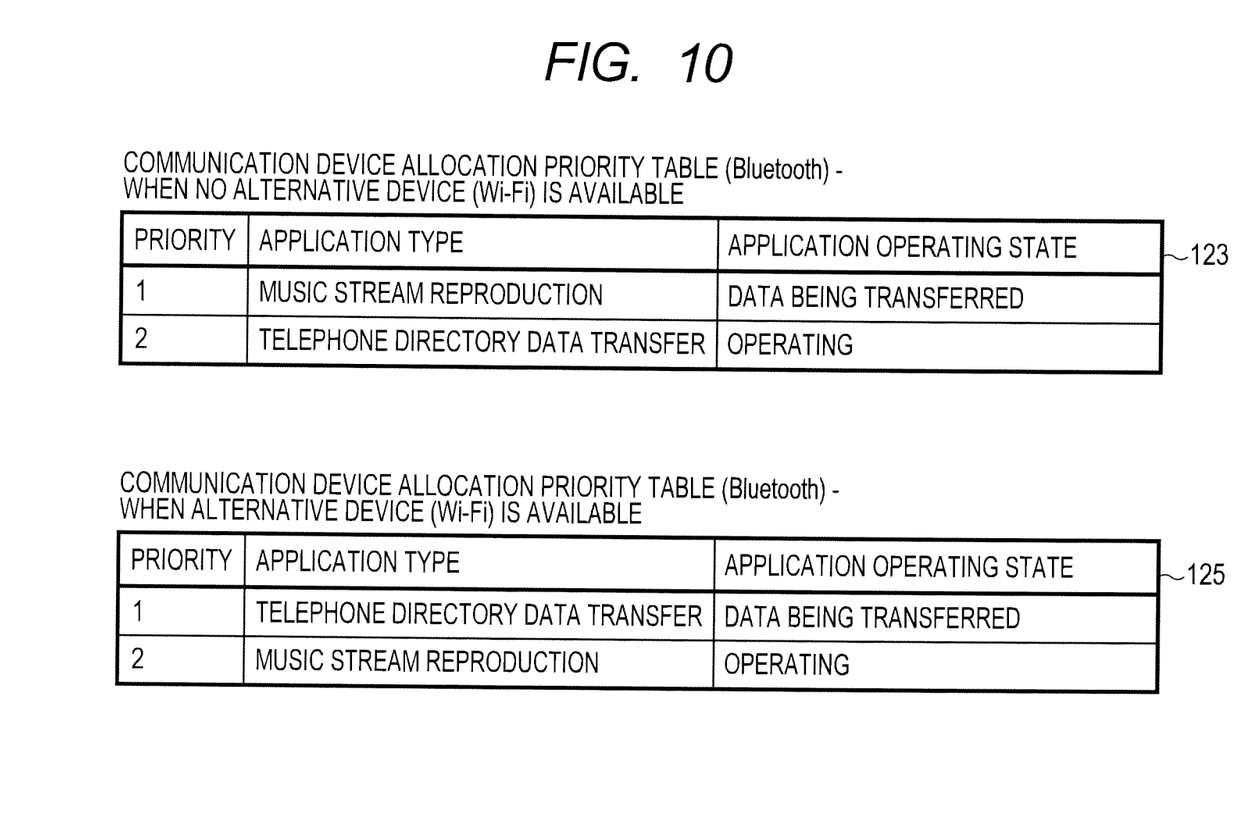
FIG. 10 is an explanatory diagram for the second embodiment of the present mode of the invention.

In the present case, communication device allocation control is performed based on the communication device allocation priority table shown in FIG. 10 and the control flowchart shown in FIG. 3. The control flow will be concretely described blow.

In a case where, while phone directory data is being transmitted by the phone directory data transfer application using the Bluetooth communication function, the music stream reproduction application has started operation to reproduce a music data stream (START in FIG. 3) using the Bluetooth communication function thereby causing competition for using the Bluetooth communication device (63 in FIG. 3), the allocation control section 11 refers to the table of managing the states of a plurality of communication devices and a plurality of applications to check whether the Wi-Fi communication device is available for use.

<When Wi-Fi Communication Device is not Available>

When the Wi-Fi communication device included in the mobile terminal 1 is not available, for example, because it is connected with an access point or because of frequency interference, the communication device allocation control section 11 allocates the right to use the Bluetooth communication function to the music stream reproduction application based on a communication device allocation priority table 123 for the Bluetooth communication device.

<When Wi-Fi Communication Device is Available>

When the Wi-Fi communication device included in the mobile terminal 1 is available for use by the phone directory data transfer application, the section of managing allocation priority table of communication devices 12 determines that there is an alternative communication device which can be used, instead of the Bluetooth communication device, by the phone directory data transfer application, and updates the communication device allocation priority table for the Bluetooth communication device as shown in Table 125.

The communication device allocation control section 11 refers to the updated communication device allocation priority table and, following the communication device allocation processing flow, allocates the right to use the Bluetooth communication function to the phone directory data transfer application. The communication device allocation control section 11, following the communication device allocation processing flow, allocates the Wi-Fi communication function to the music stream reproduction application to which the Bluetooth communication function has been determined unavailable.

Thus, the present invention enables effective utilization of an alternative device. (67 to 69 in FIG. 3) (END in FIG. 3)

Note that the present invention is not limited to a vehicle-mounted terminal.

The mobile terminal according to the present invention can be applied to a car navigation system.

What is claimed is:

1. A mobile terminal comprising a processing device, a storage device, and a plurality of wireless communication devices using different communication systems and which is connectable to another terminal mounted with a wireless communication device using a same communication system as one of the different communication systems used by the plurality of wireless communication devices, wherein the storage device holds information on availability for use of the plurality of wireless communication devices, states of use of the wireless communication devices by a plurality of applications, information on operating states of the plurality of applications, and a correspondence table in which a type of each of the applications, each of the wireless communication devices having communication functions and performance required by the each of the applications, and priority for use of each of the wireless communication devices corresponding to the type of each application, and an allocation priority table for the each of the wireless communication devices in which wireless communication device allocation priority, which is used for allocation the each of the wireless communication devices to the application, is defined, the wireless communication device allocation priority corresponding to a combination of the each application type for the each of the wireless communication devices and the operating state of the each of the applications; and wherein, when the availability for use of one or more of the wireless communication devices or a state of the another terminal changes or when an application among the applications is started by an operator, the processing device is configured to perform determination processing to determine whether competition for using a wireless communication device among the wireless communication devices occurs between the plurality of applications and, in response to a result of the determination of the competition occurrence, to perform allocation processing to allocate the plurality of wireless communication devices to the plurality of applications according to the correspondence table and the allocation priority table.

2. The mobile terminal according to claim 1, wherein, when the availability for use of one or more of the wireless communication devices changes, the processing device is configured to determine, by referring to the correspondence table, an application related with a wireless communication device whose availability for use has changed and to update, according to whether there is a wireless communication device among the wireless communication devices which the application can alternatively use, the priorities entered in the allocation priority table in which the determined application is listed.

3. The mobile terminal according to claim 1, wherein the processing device is configured to determine, in the determination processing, whether competition occurs based on a maximum transmission rate of each communication device or based on a maximum number of simultaneous connections possible.

4. The mobile terminal according to claim 1, wherein, when an application loses a right to use a communication device allocated thereto by the allocation processing, the processing device is configured to perform the allocation processing recursively.

5. The mobile terminal according to claim 1, wherein the storage device holds the allocation priority table corresponding to each of the plurality of wireless communication devices.

6. The mobile terminal according to claim 1, wherein the processing device is configured estimate an operating state of an application by collecting, from driver software for a corresponding wireless communication device, operating state information including connection completed/connection uncompleted/being engaged in data communication and a profile or protocol name.

* * * * *